May 21, 1957 — H. ERDMANN — 2,792,610
SLIDE FASTENERS
Filed April 28, 1954 — 3 Sheets-Sheet 1

INVENTOR
HANS ERDMANN
BY
ATTORNEY

May 21, 1957 H. ERDMANN 2,792,610
SLIDE FASTENERS

Filed April 28, 1954 3 Sheets-Sheet 2

INVENTOR
HANS ERDMANN

ATTORNEY

May 21, 1957 H. ERDMANN 2,792,610
SLIDE FASTENERS
Filed April 28, 1954 3 Sheets-Sheet 3
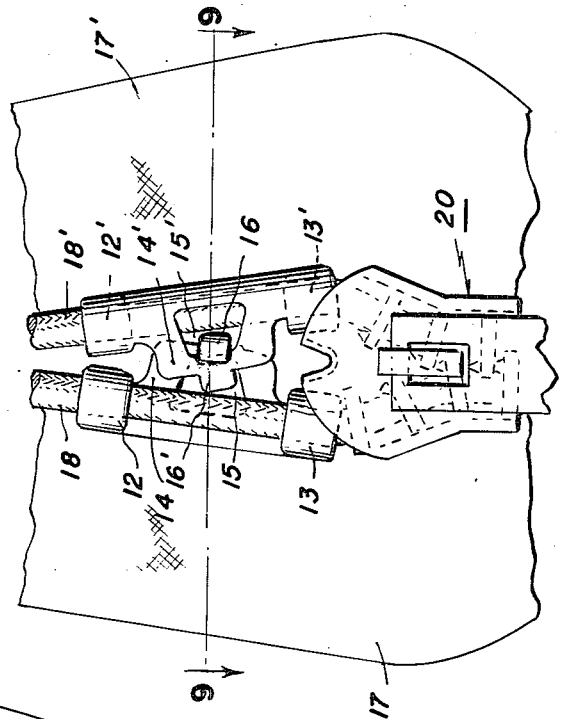
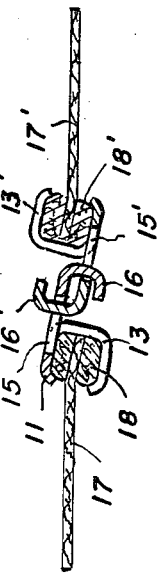
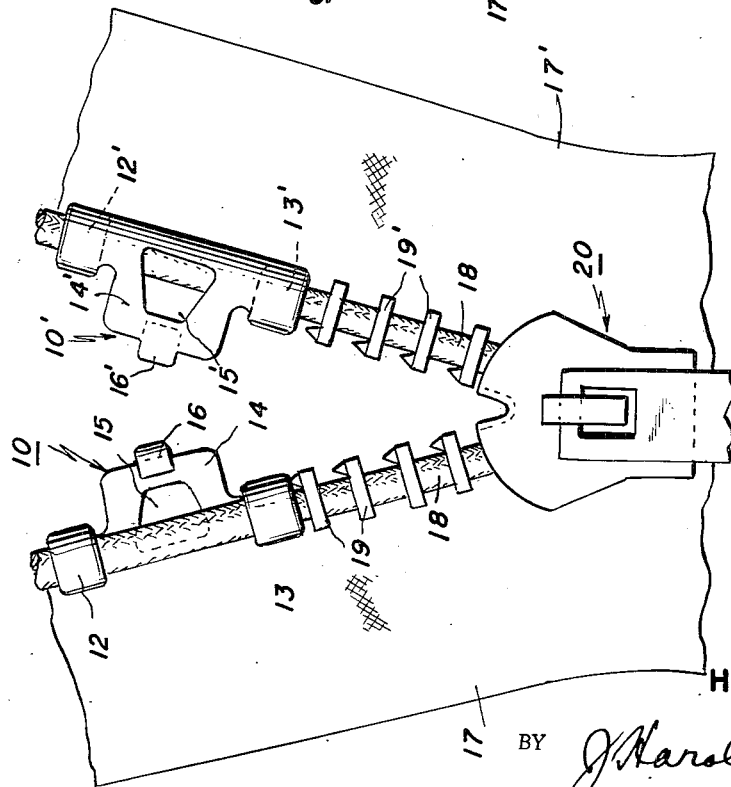
INVENTOR
HANS ERDMANN
BY
ATTORNEY United States Patent Office 2,792,610
Patented May 21, 1957

2,792,610

SLIDE FASTENERS

Hans Erdmann, Maplewood, N. J., assignor to Waldes Kohinoor, Inc., Long Island City, N. Y., a corporation of New York Application April 28, 1954, Serial No. 426,210

3 Claims. (Cl. 24—205.11)

This invention relates to improvements in slide fasteners, and more particularly to a novel and effective end connection for positively yet detachably connecting the element-free lengths of fastener stringers which extend beyond the endmost fastener elements of the fastener.

As is well known, in certain garments such as men's trousers, ladies' bathing suits, corsets and the like having an opening closed by a slide fastener, a positively yet quickly and readily separable connection between the element-free ends of the fastener stringers extending beyond the endmost (uppermost) fastener elements and the end of the fastener or opening closed thereby would be most desirable, as such would permit the fastener to be easily opened and closed at its top end while at the same time it would provide security against unintentional opening of the fastener. While a so-called stop serving to limit movement of the fastener slider past its end position may be and is usually attached to one or both of these extending element-free length portions of the fastener stringers, such free lengths are not connected one to the other, because the conventional top stop is not capable of providing this desirable connection. Hence, if the slider employed is of the non-locking type, or if it has not been properly locked, there is nothing to prevent it from gradually creeping away from its end position, i. e. moving in fastener opening direction, under lateral forces applied to the closed end of the fastener and tending to separate the fastener stringers, with the result that an imperfect and unsightly closure results.

An important object of the present invention, therefore, is the provision of a novel and improved form of end connection for separably yet securely connecting the element-free ends of a slide fastener which extend between the engaged fastener elements thereof and the end of the opening closed by the fastener, according to certain forms of garments, articles and the like.

Another main object of the invention is the provision of a combined top-stop and end connector for slide fasteners which, in addition to serving as a slider-movement limiting means, also provides a simple yet highly effective separable connection between the element-free ends of the fastener stringers which extend beyond the slider when the latter is in its fastener-closing end position.

Yet another object of the invention is the provision of a two-part top stop also functioning as a hook-and-eye type of closure or fastener for the element-free ends of the tapes of a slide fastener which, by effecting a positive connection between said ends, adds a high degree of security against unintentional opening of the fastener.

A further object of the invention is the provision of a two-part top stop and hook-and-eye closure, as aforesaid, characterized in that the two parts making up the hook-and-eye end closure are of identical shape and construction.

Yet a further object of the invention is the provision of a two-part top stop capable of being fashioned from sheet metal and wherein said parts are of identical construction, being each characterized by an elongated flat body provided at its ends with clamping means for affixing same to the respective stringers, and with an intermediate portion capable of serving either as the hook or the eye member of a hook-and-eye closure for said stringers.

A still further object of the invention is the provision of a combined top stop and end connector for slide fasteners whose fastener elements are adapted to be engaged and disengaged by a slider, wherein said combined top stop and connector is composed of two parts which are so constructed and arranged that, when interconnected one with the other and engaged by the slider in its endmost or fastener closing position, they cannot be disconnected, thus precluding opening of the fastener until intentional movement of the slider in fastener opening direction has been initiated.

The above and other objects and advantages of a combined top stop-end connector for slide fasteners according to this invention will appear from the following detailed description thereof in which reference is had to the accompanying drawings illustrating a preferred physical embodiment thereof, wherein:

Fig. 7 is a view similar to Fig. 4 but illustrating an alternate disposition of a top stop and end connector part on a fastener stringer;

Fig. 8 is a view similar to Fig. 5, illustrating the top stop and end connector according to Fig. 7 in its fully engaged position; and Fig. 9 is a section taken along line 9—9 of Fig. 8.

Figure 1:
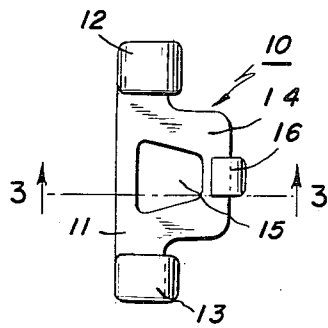
Figs. 1 and 2 are plan and front edge views, respectively, of a slide fastener top stop and end connector according to the invention.
Figure 4:
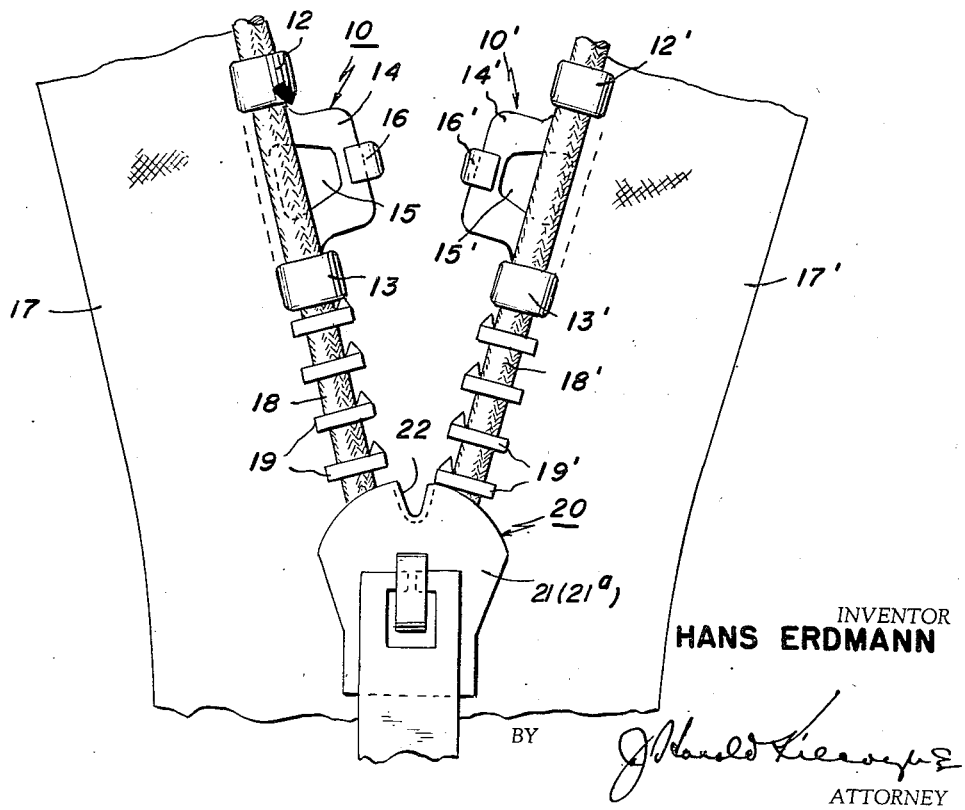
Fig. 4 is a plan view of a portion of a slide fastener employing the combined top stop and end connector of the invention, in which the fastener is shown to be partially open so as to illustrate the two parts of the top stop and end connector in their disengaged position.

Referring to the drawings, reference numeral 10 generally designates one part of a two-part top stop and end connector for slide fasteners according to the invention, it being understood that the other part is of identical construction. As best seen in Fig. 1, each part has an elongated planar body portion 11, which is provided at both its upper and lower ends with pairs of clamping jaws 12, 13. Intermediate its ends, the body portion is widened appreciably as at 14, such widening resulting in said body portion reaching in the direction of the companion top stop and end connector part, when said parts are clamped to their fastener tapes as seen in Fig. 4. Formed in the widened intermediate portion is an aperture providing an eye 15, and extending integrally from the protruding side edge of said portion is a hook 16 whose bill is turned forwardly so as to overlie the protruding edge portion from which it extends. Top stop and end connector parts as illustrated may be simply constructed in quantity by stamping the same from sheet metal, first to the form of flat blanks, and thereafter appropriately bending the blank portions which are to define the clamping jaws 12, 13 and the hook 16 out of the plane of the blanks, as indicated.

Referring to Fig. 4, such shows a more or less conventional slide fastener comprising a pair of longitudinal tapes 17, 17' provided along their adjacent edges with beads 18, 18' to which are clamped or otherwise secured rows of oppositely disposed fastener elements 19, 19', said tapes and their fastener elements being commonly referred to as the fastener stringers. As is well understood, the fastener elements of one stringer are adapted to be engaged with and disengaged from the fastener elements of the other stringer by means of a slider generally designated 20 having spaced front and rear wings 21, 21a connected by an indented V-neck 22 which also functions as a divider serving to separate engaged fastener elements 19, 19' upon movement of the slider in appropriate direction. The aforesaid slider wings, their side-edge flanges (not shown) and the divider 22 together define a Y-shaped channel within the slider body through which the fastener stringers move relatively of the slider as the latter is actuated. In the illustrated fastener, movement of the slider 20 in upward direction effects engagement of the fastener elements 19, 19' and hence closing of the fastener, and movement of the slider in reverse or downward direction results in disengagement of the fastener elements and hence opening of the fastener.

As explained in the foregoing, there are numerous slide fastener applications which, for various reasons, do not permit of the fastener elements 19, 19' being applied to the ends of the stringer tapes, with the result that said tapes must of necessity have element-free end portions, which portions, at the upper end of the fastener, extend beyond the slider when it is positioned in its uppermost of fastener closing position to the end of the closure. Usually, means such as a top stop for preventing movement of the slider past its aforesaid position is secured to the bead of at least one of the element-free end portions of the tapes as aforesaid, but the conventional top stop is not designed to provide a positive end connection between such portions. On the other hand, the desirability of a positive connection between the element-free top end portions of the tapes becomes evident when it is considered that forces tending to spread the upper ends of two fastener stringers held together only by a slider can result in the slider giving way completely if locked or, if unlocked or improperly locked, in creeping from its endmost or fastener closing position, either of such conditions in turn resulting in an unsightly and/or imperfect closure.

Figure 2:
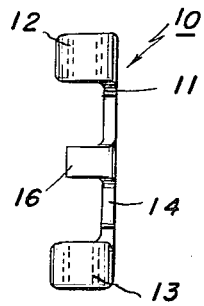
Figure 3:
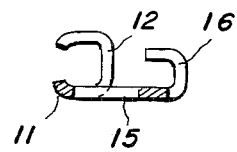
Fig. 3 is a section taken along line 3—3 of Fig. 1.

Not only is a desirable positive connection between the element-free top end portions of the fastener stringers attained, but also an effective top stop is provided, through the use of a two-part top stop and end connector composed of a part such as the part 10, shown in Figs. 1–3, together with an identical part, upon said two parts being applied to the stringer tapes 17, 17' in the manner shown in Fig. 4. In this view, the part 10 is clamped by means of its jaws 12, 13 to the top element-free portion of the edge bead 18 of the lefthand fastener stringer, in position such that its widened portion 14 projects laterally outwardly from said bead, and the companion part 10' is similarly clamped to the top element-free portion of the opposite bead 18', it being observed that the parts 10 and 10' are thereupon disposed in facing relation. Preferably, and as seen in Fig. 6, each of the parts 10, 10' is attached to its stringer tape from the same side thereof, preferably the rear side, such having the advantage that each of said parts is substantially covered by the tape overlying the same.

Figure 5:
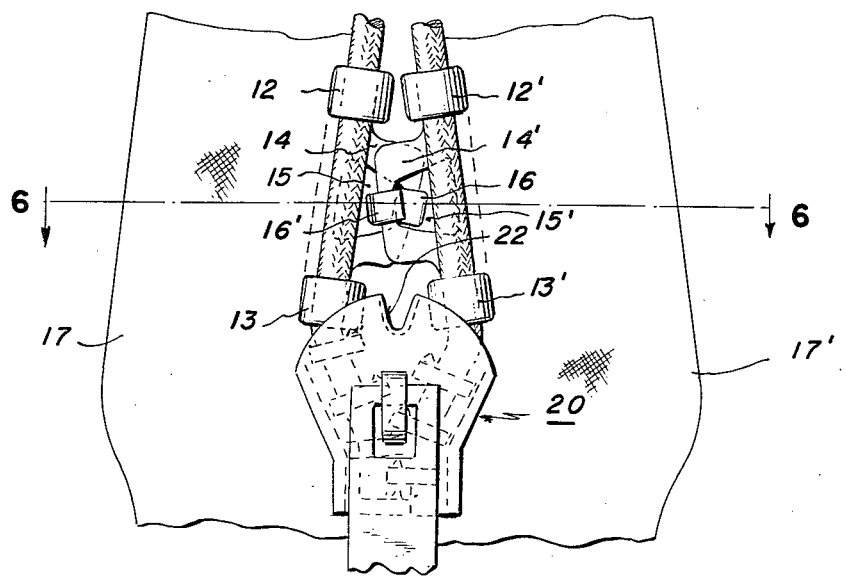
Fig. 5 is a view similar to Fig. 4 but illustrating the slider in its full fastener closing position, and the combined top stop and end connector parts to be fully engaged.
Figure 6:
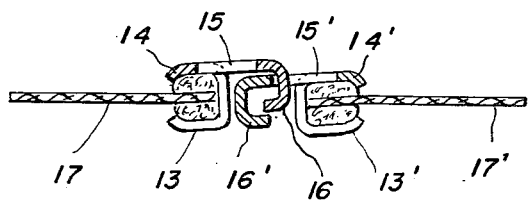
Fig. 6 is a section taken along line 6—6 of Fig. 5.

Referring to Figs. 5 and 6, such illustrate one way of interengaging the parts 10, 10' so that they function both as a top stop and a top end connection for the illustrated fastener. Such is effected simply by superimposing the widened portion 14' of the righthand part on the corresponding widened portion 14 of the lefthand part, at the same time threading the hook 16 of the now rearward part 10 through the aperture 15' of the superimposed upper part 10' and thereupon slightly spreading said parts so that they positively interengage as shown. It will of course be understood that the parts 10 and 10' may also be engaged and interconnected by superimposing the widened intermediate portion 14 of the lefthand part 10 on the corresponding widened portion 14' of the righthand part 10', as results in the hook 16' of the latter part moving through the aperture 15 of the upper lefthand part. In either case, the parts 10 and 10' interengage in the manner of a hook-and-eye closure or fastener; in fact, each said part combines both the hook and the eye components of a hook-and-eye fastener, so that either may function as the hook of the fastener and either as the eye of the fastener, depending upon the manner in which they are cooperated.

In addition to the top stop and end connector parts 10, 10' serving when engaged to secure the element-free ends of the tapes together, their construction is further such that they are capable of being locked in engaged relation by the slider 20 upon the latter being actuated to its full raised (fastener-closing) position. Such will be explained in connection with Fig. 5 illustrating that through proper dimensioning of at least the lowermost clamping jaws 13, 13' of the parts 10, 10' so that they have somewhat lesser thickness than the depth of the channel provided in the slider 20, and through further dimensioning of said parts so that, when connected one to the other, the spacing between their aforesaid clamping jaws 13, 13' is slightly less than the spacing between the branch channels which open through the top of the slider 20, said jaws may move into said branch channels when the slider is actuated to its uppermost position, as shown. When such takes place, the lower ends of the connected parts 10, 10' are spread apart slightly by the divider 22 and are thereafter maintained spread, as shown with some exaggeration. Since said parts are designed to be moved towards one another slightly to effect their disengagement, and because this movement cannot occur when they are held spaced by the slider positioned as in Fig. 5, the aforesaid parts 10, 10' are locked together so long as they are so engaged by the slider 20. Preferably, the slider is of the so-called locking type whereby it may be locked in the position shown. Accordingly, disengagement of the top stop and connector parts 10, 10' can be effected only when the slider is unlocked and its intentional movement in fastener opening direction has been initiated.

Referring to Figs. 7–9, such illustrate the same combined top stop and end connector as described above, except that the two parts 10, 10' making up same are arranged so as to interengage in somewhat different fashion than as previously described. For example, the part 10', rather than being attached to the rear of the righthand stringer tape, is instead attached to the front thereof and hence the bills of the hooks 16, 16' face one another. To interengage the parts 10, 10' arranged as in Fig. 7, the bill of the hook 16' of the part 10' is passed through the eye 15 of the other part 10, and the bill 16 of the hook of the latter part 10 is passed through the eye 15' of the first-mentioned part 10'. Such results in a dual interengagement of the parts, as best illustrated in Fig. 9.

It will be understood from Fig. 8 that the same spreading of at least the lower ends of the interengaged top stop and end connector parts is effected by the slider upon movement thereof to its full raised (fastener closing) position, as was previously described in connection with Fig. 5; that is to say, the desirable locking of the combined top stop and end connector parts is achieved with the parts arranged as illustrated in Figs. 7–9, as with the previously described arrangement of top stop parts illustrated in Figs. 4–6.

From the above, it will be appreciated that a combined top stop and end connector for slide fasteners, as illustrated and described in the foregoing, has the advantage that since the parts making up the same are identical, they can be easily manufactured and applied. Moreover, since each connects part incorporates both of the hook-and-eye components of a hook-and-eye fastener, said parts may be securely interengaged, regardless of which part functions as the hook and which part functions as the eye, or whether there is a double hook-and-eye connection. Furthermore, regardless of which form of engagement is employed, a secure and easily effected separable connection at the ends of the slide fastener stringer is achieved by identical hook-and-eye members of simple shape.

Another important objective of the invention is attained in the novel cooperation of the top stop and end connector parts as aforesaid with the fastener slider upon movement of the latter to its full fastener closing position which enables slider position to determine if and when their separation may be effected, as follows from the fact that disengagement of the interconnected top stop and end connector parts can be effected only when movement of the slider from its uppermost or fastener closing position towards fastener opening position has been initiated. Such results in a slide fastener end connection giving a high degree of security, since the wearer is no longer called upon to rely solely on the locking action of the slider which may be exposed to forces beyond its endurance or ability to withstand but, instead, can depend for both closing and locking action of the slide fastener as a whole on a sturdy top stop and end connector having considerably greater resistance to side pull than does the slider.

As many changes could be made in carrying out the above constructions without departing from the scope of the invention, it is intended that all matter contained in the above description or shown in the accompanying drawings shall be interpreted as illustrative and not in a limiting sense.

I claim:

1. In a slide fastener, the combination of a pair of longitudinal fastener tapes having adjacent beaded edges, rows of oppositely disposed fastener elements secured to said tape beads, said rows terminating short of an end of the fastener whereby the tapes have element-free portions at an end thereof, a slider carried by said tapes and being operative to engage the fastener elements when actuated towards said end and to disengage said elements when actuated in the opposite direction, said slider having spaced front and rear wings and a divider which together define a Y-shaped channel for the oppositely disposed fastener elements, and a two-part connector operative between the element-free end portions of the tapes, each part comprising an elongated plane body portion having pairs of clamping jaws at its ends for clamping said part generally along one side edge thereof to the edge bead of one said end portion, and interengaging means in its intermediate portion for connecting said part to the other connector part, the dimension and lateral spacing of the corresponding clamping jaws of said parts which are disposed adjacent the slider being such that upon the slider being actuated to its full fastener-closing position they enter the inclined branches of the slider channel and are spread apart by the divider member of the slider.

2. A slide fastener as set forth in claim 1, wherein the two parts of the connector are of identical construction and are each provided with a hook member and an eye member, whereby either part may function as a hook member and the other part as an eye member.

3. A combined top stop and end connector for slide fasteners, comprising two identical parts, each part having an elongated plane body portion provided at its ends with clamping jaws enabling said part to be clamped generally along one side edge thereof to one fastener stringer in oppositely disposed relation to the other part clamped to the other stringer, said body portion including a widened intermediate portion reaching toward the other part and having a protruding side edge remote from said one edge of the body portion, said widened portion of each part being provided with an opening defining an eye and with a hook extending from its protruding side edge, the construction and arrangement being such that either part may function both as the hook or the eye of a hook-and-eye fastener.

References Cited in the file of this patent

UNITED STATES PATENTS

| 479,492 | Davis | July 26, 1892 |
| 2,190,609 | Farnstrom | Feb. 13, 1940 |

FOREIGN PATENTS

| 533,578 | Great Britain | of 1941 |